Nov. 25, 1941.                H. T. FAUS                 2,264,073
        TEMPERATURE COMPENSATING RESISTOR AND METHOD OF MAKING THE SAME
                          Original Filed March 23, 1939

Inventor:
Harold T. Faus,
by Harry E. Dunham
His Attorney.

Patented Nov. 25, 1941

2,264,073

UNITED STATES PATENT OFFICE 2,264,073

TEMPERATURE COMPENSATING RESISTOR AND METHOD OF MAKING THE SAME

Harold T. Faus, Lynn, Mass., assignor to General Electric Company, a corporation of New York Original application March 23, 1939, Serial No. 263,693. Divided and this application February 6, 1941, Serial No. 377,752

15 Claims. (Cl. 201—76)

This application is a division of my copending application, Serial No. 263,693, filed March 23, 1939, which is in turn a division of my application, Serial No. 80,975, filed May 21, 1936, on which Patent No. 2,213,085 was granted.

It is an object of my invention to provide electrical resistors and resistance elements having a negative temperature coefficient of resistance which is substantially uniform throughout a long range of temperatures.

Another object of my invention is to provide a highly sensitive resistance type thermometer.

My invention relates likewise to negative temperature coefficient of resistance materials and methods of making them. Other and further objects and advantages will become apparent as the description proceeds.

In accordance with my invention in its preferred form, in compensating a current-conducting device for the rise in resistance which occurs therein with increasing temperature, I connect a compensating resistor in series with the device to be compensated and I utilize a compensating resistor having a substantially linear negative coefficient of resistance exceeding in numerical value the positive temperature coefficient of resistance of the device to be compensated. For current-responsive devices, the compensating resistor is preferably one having a temperature coefficient at least substantially three times that of the device compensated so that only a fraction of the total resistance loss occurs in the compensating resistor and the sensitivity of the device is not greatly impaired by the addition of the temperature compensation.

Figure 1:
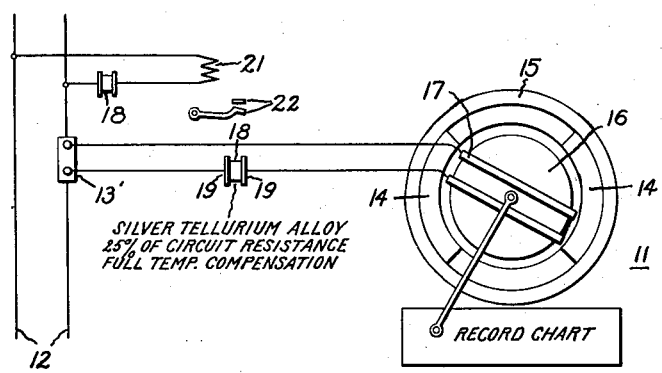
Figure 2:
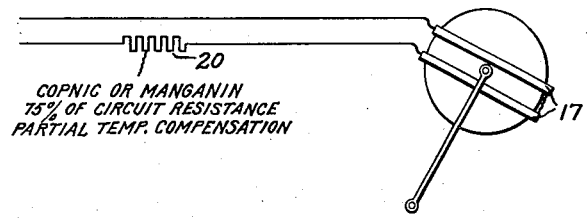
Figure 3:
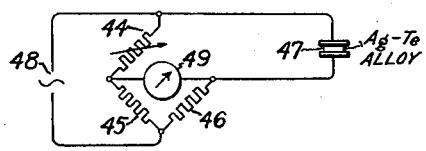
Figure 4:
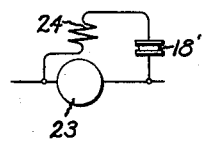

The invention will be understood more readily from the following detailed description when considered in connection with the accompanying drawing and those features of the invention which are believed to be novel and patentable will be pointed out in the claims appended hereto. In the drawing, Fig. 1 is a circuit diagram schematically representing an embodiment of my invention as applied to measuring instruments or relays; Fig. 2 is a fragmentary circuit diagram of an instrument employing the conventional temperature compensation. Fig. 3 is a circuit diagram of another embodiment of my invention serving as a resistance thermometer; Fig. 4 is a circuit diagram of another embodiment of my invention applied to temperature compensation of motor speed.

Like reference characters are utilized in the drawing to designate like parts throughout. In Fig. 1, there is shown a recording instrument 11 arranged to measure the current in an electric circuit 12. A shunt 13 carries the current to be measured and the instrument 11, which is really a millivoltmeter, is connected across the shunt 13 to deflect in accordance with the voltage drop in the shunt.

For the sake of compactness, the instrument 11 has a field structure of the type disclosed in my Patent No. 1,985,082 with radially-magnetized annular-segment permanent magnets 14, a keeper 15 of magnetic material surrounding the permanent magnets and a soft iron core 16, or the field structure may be of the type having an internal permanent magnet as disclosed in Patent No. 1,920,764, Nickle. Such field constructions are not especially well adapted to temperature compensation by means of variable permeability elements shunting the air gap, and temperature compensation is ordinarily better accomplished by suitable means in the electrical circuit.

The movable element of the instrument 11 comprises a winding 17 carried on suitable pivots (not shown). Such windings are customarily composed of copper, which has a relatively high conductivity. The resistance of copper, however, as well as that of other known materials suitable for movable instrument windings, has a positive temperature coefficient of resistance, causing the calibration of the instrument to vary with temperature. In order to overcome the temperature error without greatly reducing the sensitivity of the instrument, I connect in series with the winding 17 a compensating resistor 18 having a negative temperature coefficient of resistance approximately equal in numerical value to three times the temperature coefficient of resistance of copper, and having a resistance at the average temperature of the instrument of approximately one-third the resistance of the winding 17.

One form of the high negative temperature coefficient compensating resistor 18 is composed of an alloy of fifteen percent silver and eighty-five percent tellurium. A method of making such resistors which I have found to be satisfactory is described as follows:

The alloy is made by adding silver or some other suitable element of the same family in the periodic table, to molten tellurium in a porcelain crucible, the silver dissolving rapidly when the tellurium is at a temperature barely above its melting point. This operation is carried out in an oxidizing atmosphere or in air while the mixture is being stirred to permit oxidation to take place freely.

The most convenient method of casting the alloy into resistors is to draw the molten alloy into glass tubes by means of a partial vacuum. After it has solidified in the tube, it may sometimes be pushed out in lengths of several inches without breaking. If it cannot be pushed out of the tube, it is placed in a solution of hydrofluoric acid which dissolves the glass without affecting the alloy. In order to stabilize the temperature-resistivity curve of the alloy, it is subjected to a simple annealing treatment.

After a heat treatment at from about 115 to 125° C. for about fifteen hours, an alloy is obtained which gives a substantially linear temperature resistance curve from minus 40° C. to plus 50° C. and shows no time lag in assuming the resistance corresponding to any temperature within this range. According to the annealing temperature employed, a negative temperature coefficient of resistance is obtained from about 1.2 to about 1.3 per cent per degree C.

I have found that the alloy made in the form of single crystal rods by passing the glass tubes containing the molten alloy from a furnace at a temperature of 480° C. into an oil bath at a temperature of 25 to 100° C. at a uniform rate of approximately ⅜" per minute. By this procedure solidification begins at one end and progresses at a uniform rate to the other end. The single crystal resistor has the advantages over poly-crystalline resistors of freedom from cracks, greater mechanical strength, and less likelihood of damage from electrolysis.

Good electrical connections may be made to this alloy by electroplating with nickel or cobalt and soldering to the plated surface. If desired, copper terminals 19 may be soldered to the plated alloy resistor 18.

As the temperature coefficient of resistance of copper is approximately .4 per cent per degree C. and my compensating resistor has a temperature coefficient of resistance of over 1.2 per cent per degree C., but negative, it is apparent that the numerical value of the temperature coefficient of resistance of my compensating resistor is at least three times that of copper. Consequently, a compensating resistor having a resistance at average ambient temperature of only one-third the resistance of an instrument winding serves to provide complete temperature compensation of the instrument for resistance variations. The compensating resistor constitutes but twenty-five per cent of the circuit resistance of this instrument and reduces its sensitivity but twenty-five per cent.

On the other hand, if a substantially zero temperature coefficient of resistance series resistor is used for compensation in accordance with known practice, the sensitivity is reduced in the same ratio as the temperature error. For example, in order to make the overall temperature coefficient of resistance .1 instead of .4, reducing the temperature error to a fourth, it is necessary to connect in series a zero temperature coefficient of resistance resistor 20 (Fig. 2) having three times the resistance of the winding. There is a loss of seventy-five per cent of the available voltage. Inasmuch as the voltage available from a current shunt is limited, it will be apparent that twenty-five per cent of the available voltage will be insufficient to produce the torque required in a recording instrument.

Obviously, the invention is not limited to recording instruments but includes current-conducting devices of various types subject to temperature error. For example, a relay 21, connected across the source 12, may be caused to operate its contacts 22 accurately at the same voltage regardless of temperature conditions by connecting in series with the relay a negative temperature coefficient of resistance resistor 18' having such resistance as to compensate for variations in impedance of the winding of the relay 21.

Under certain circumstances a negative temperature coefficient of as much as 1.3 per cent per degree C. may not be desired. For such circumstances, I may reduce the temperature coefficient in one or more of several ways. I may reduce the annealing temperature or the annealing time or I may vary the percentage of silver above or below 15 per cent, which I find gives substantially the maximum coefficient. For example, to obtain a negative temperature coefficient of .7 per cent per degree C., I may anneal a 15 per cent silver, 85 per cent tellurium alloy at 105° for about 15 hours or at 115° for about 4½ hours. To obtain a negative temperature coefficient of .1 per cent per degree C., I may resort to little or no annealing. I have found in the case of annealed alloy resistors containing silver, as well as tellurium, that linearity of the resistance temperature curve over a substantial temperature range is no longer obtained when the silver percentage is below 4% or above 20%, because at these points the resistance temperature curves tend to become concave downward and concave upward, respectively. Preferably, the silver percentage exceeds 5% in order to obtain advantages over pure tellurium as a temperature compensating resistor material.

As illustrated in Fig. 4, the tendency of a shunt-wound motor 23 or a separately excited meter to vary in speed owing to variations in field current with temperature variations in field resistance or impedance may be overcome by connecting a negative temperature coefficient of resistance resistor 18' in series with the field or exciting winding 24.

In carrying out my invention in connection with temperature measurement, a Wheatstone bridge may be employed as illustrated in Fig. 3 comprising resistance arms 44, 45 and 46, one or more of which is adjustable, for example, the arm 44, a resistance arm 47 composed of high negative temperature coefficient of resistance material, a source of current 48, and a galvanometer 49, which will, of course, be a suitable alternating-current instrument or detector if the source 48 is alternating. The resistance arm 47 may be composed of heat-treated silver tellurium alloy such as described. The use of alternating current has the advantage of guarding against any electrolysis of the resistor 47 in order to insure a high degree of constancy of its temperature-resistance curve. One of the other resistance arms, for example, the arm 46, may be of manganin or other suitable zero temperature coefficient of resistance material. Any effect of variations in ambient temperature on the resistances of the remaining two arms if made of like materials will be immaterial since their ratio will be unaffected. If desired, the arm 46 also may be of ordinary resistance material and its resistance variation may be allowed for in the calibrations. The arm 47 is placed at the point where the temperature is to be measured and the bridge is balanced by suitable adjustment of the variable resistance arm 44, which may be calibrated in degrees of temperature. If desired, the arms 47 and 46 may both be placed at the measured point. Owing to the high temperature coefficient of the silver tellurium alloy employed, a highly sensitive resistance thermometer is thus produced.

In cases where linearity of temperature change of resistance is not required much below 0° C., I may utilize substantially pure tellurium resistors for the applications described in this specification. Such resistors are not subject to damage by electrolytic effects regardless of the length of time direct current may be passed through them. Preferably tellurium resistors are processes in the same manner as the tellurium alloy resistors previously described, i. e., they are formed in single crystals by progressive solidification and subjected to the same annealing treatment.

I have discovered a relationship between thermal E. M. F. and temperature coefficient of certain classes of material. Not only tellurium and silver tellurium but also other materials having high negative temperature coefficient tend also to have a high thermal electromotive force. For example, I have found that an alloy containing equal atomic proportions of cadmium and antimony, known for its high thermal electromotive force, likewise has a high substantially linear negative temperature coefficient of resistance, exceeding 1.2 per cent per degree C., and is suitable for the applications described in this specification. Such an alloy may be prepared in rods cast in glass tubes explained in connection with the preparation of tellurium silver alloy. I have found also that cadmium antimony alloy is substantially free from electrolysis effects.

I have herein shown and particularly described certain embodiments of my invention and certain methods of operation embraced therein for the purpose of explaining its principle and showing its application but it will be obvious to those skilled in the art that many modifications and variations are possible and I aim, therefore, to cover all such modifications and variations as fall within the scope of my invention which is defined in the appended claims.

What I claim as new and desire to secure by Letters Patent of the United States is:

1. A resistor composed of an annealed alloy consisting substantially of tellurium and between 4 and 20 per cent of silver.

2. A resistor comprising annealed crystalline material consisting of silver and sufficient tellurium to give the resistor a negative temperature coefficient of resistance exceeding .4% per degree centigrade.

3. A method of preparing a tellurium silver alloy containing a predominating proportion of tellurium which comprises adding silver to molten tellurium in an oxidizing atmosphere while maintaining the tellurium at a temperature barely above its melting point and stirring the mixture, casting the alloy, and annealing at a temperature exceeding 100° F.

4. A method of preparing single crystal rods of alloy comprising an appreciable proportion of silver and a predominating proportion of tellurium which comprises preparing the molten alloy, drawing the same into tubes, and passing the tubes from a furnace at a temperature of about 480° C. into an oil bath having a temperature between 25 and 100° C. at a uniform rate of speed at approximately three-eighths of an inch per minute.

5. An electrical resistance element composed of an annealed alloy consisting of tellurium and silver, with the tellurium content predominating.

6. An electrical resistance element composed of an annealed alloy consisting of tellurium and from 1 to 30% silver.

7. An electrical resistance element composed of an annealed alloy consisting of tellurium and from 10 to 20% silver.

8. An electrical resistance element composed of an annealed alloy or intimate mixture consisting substantially of tellurium and a member of the silver family and comprising 1 to 30% silver and at least 50% tellurium.

9. An electrical resistance element consisting between 4 and 20% silver and substantially all the remainder tellurium.

10. An alloy comprising between 12 and 20% silver and over 60% tellurium consisting substantially of tellurium and a member of the silver family.

11. An alloy comprising approximately 15% silver and substantially all the remainder tellurium.

12. An alloy comprising tellurium predominantly and sufficient silver to make the temperature coefficient of electrical resistance of the alloy linear below zero degree centigrade.

13. As an article of manufacture an alloy comprising from 1 to 30% silver and over 50% tellurium annealed at a temperature exceeding 100 degrees centigrade for more than ten hours.

14. A resistor composed of a tellurium alloy consisting substantially of tellurium and a member of the silver family containing at least 10% silver and not more than 90% tellurium.

15. A method of improving the resistance temperature characteristics of a silver tellurium alloy which comprises annealing the alloy at a temperature from 115° to 125° C. for about 15 hours.

HAROLD T. FAUS.